US011003688B2

(12) United States Patent
Alvarez et al.

(10) Patent No.: US 11,003,688 B2
(45) Date of Patent: May 11, 2021

(54) SYSTEMS AND METHODS FOR COMPARING DATA ACROSS DATA SOURCES AND PLATFORMS

(71) Applicant: AMERICAN EXPRESS TRAVEL RELATED SERVICES COMPANY, INC., New York, NY (US)

(72) Inventors: Karina Alvarez, Plantation, FL (US); Sachin Arya, New Delhi (IN); Sandeep Bose, Scottsdale, AZ (US); Subhash Godara, Gurugram (IN); Anmol Handa, Faridabad (IN); Ajay Paul Singh Manesh, Gurgaon (IN); Purvi Shah, East Brunswick, NJ (US); Bhupesh Sharma, Gurgaon (IN)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 16/560,124

(22) Filed: Sep. 4, 2019

(65) Prior Publication Data
US 2021/0064637 A1 Mar. 4, 2021

(51) Int. Cl.
*G06F 16/27* (2019.01)
*G06F 16/28* (2019.01)

(52) U.S. Cl.
CPC ............ *G06F 16/27* (2019.01); *G06F 16/287* (2019.01); *G06F 16/288* (2019.01)

(58) Field of Classification Search
CPC ....... G06F 16/27; G06F 16/287; G06F 16/288
See application file for complete search history.

(56) References Cited

U.S. PATENT DOCUMENTS

| | | | | |
|---|---|---|---|---|
| 2008/0300962 | A1* | 12/2008 | Cawston | G06Q 10/10 705/7.13 |
| 2014/0122245 | A1* | 5/2014 | Qu | G06Q 30/0269 705/14.66 |
| 2014/0149204 | A1* | 5/2014 | Schler | G06Q 30/0242 705/14.41 |
| 2018/0025503 | A1* | 1/2018 | Tsai | G06F 11/368 382/100 |
| 2019/0051389 | A1* | 2/2019 | Meittunen | G16H 10/20 |
| 2019/0251593 | A1* | 8/2019 | Allouche | G06Q 30/0269 |
| 2019/0303378 | A1* | 10/2019 | Angle | G06F 16/2272 |
| 2019/0362452 | A1* | 11/2019 | Brunets | G06F 16/2477 |

* cited by examiner

*Primary Examiner* — Beau D Spratt
(74) *Attorney, Agent, or Firm* — Thomas | Horstemeyer, LLP

(57) ABSTRACT

A system for data comparison is disclosed. The system may receive a source configuration metadata. The system may configure a data extraction module to extract data from a data set in response to the source configuration metadata. The system may generate a pre-work data from the data set. The system may compare the pre-work data to generate a post-process data set. The system may generate a report corresponding to the post-process data set.

20 Claims, 5 Drawing Sheets

| Data Element | # Analyzed | % Matched | Any One Value Missing | | Both Values Missing | Both Values Present & Not Matched |
| --- | --- | --- | --- | --- | --- | --- |
| | | | SOURCE 1 | SOURCE 2 | | |
| Last Name | 107M | 99.97 % | 0.0 % | 0.01% | 0.01% | 0.01% |
| DoB | 107M | 99.94 % | 0.0 % | 0.0 % | 0.0 % | 0.06% |
| SSN | 107M | 88.97 % | 0.17% | 0.00% | 10.86% | 0.00% |
| Address | 107M | 98.13 % | 0.42% | 0.00% | 0.11 % | 1.34 % |
| First Name | 107M | 99.81 % | 0.10% | 0.07% | 0.02% | 0.00% |

SYSTEMS AND METHODS FOR COMPARING DATA ACROSS DATA SOURCES AND PLATFORMS

FIELD

The present disclosure generally relates to systems and methods for comparing data across data sources and platforms.

BACKGROUND

Large data sets may exist in various sizes and organizational structures. With big data comprising data sets as large as ever, the volume of data collected incident to the increased popularity of online and electronic transactions continues to grow. For example, billions of records (also referred to as rows) and hundreds of thousands of columns worth of data may populate a single table. The large volume of data may be collected in a raw, unstructured, and undescriptive format in some instances. The massive amounts of data in big data sets may be stored in numerous different data storage formats in various locations to service diverse application parameters and use case parameters. Data variables resulting from complex data transformations may be central to deriving valuable insight from data driven operation pipelines. Additionally, insights may be gained from functional linkages between operational data. Traditional methods of data analysis are typically hard coded into systems and may be system specific and/or definitive of a systems environment. As a result, comparison and analysis of data between differing data environments may be difficult and/or time consuming.

SUMMARY

In various embodiments, systems, methods, and articles of manufacture (collectively, the "system") for data comparison are disclosed. In various embodiments, the system may receive a source configuration metadata. The system may configure a data extraction module to extract data from a data set in response to the source configuration metadata. The system may generate a pre-work data from the data set. The system may compare the pre-work data to generate a post-process data set. The system may generate a report corresponding to the post-process data set.

In various embodiments, the data set includes at least a first data source and a second data source. In various embodiments, the post-process data set includes at least one of a match rate data, an overlap data, and a sample data. In various embodiments, the system may generate at least one of a match rate report based on the match rate data, an overlap report based on the overlap data, or a sample report based on the sample data. In various embodiments, the system may receive a comparison configuration metadata. The system may configure a comparison module based on the comparison configuration metadata and generate the post-process data set based on the comparison configuration metadata. In various embodiments, the comparison configuration metadata includes at least one of a report type, a comparison name, a comparison description, a column name, a derived logic, or a filter logic. In various embodiments, the source configuration metadata includes at least one of a data location, a data directory, a table name, a table filter, a joining column, a database name, a host name, a port, a username, a password, an index, or a bucket.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 3 illustrates a match rate report of a data comparator system, in accordance with various embodiments;

FIG. 5 illustrates a sample data report of a data comparator system, in accordance with various embodiments.

DETAILED DESCRIPTION

Figure 1:
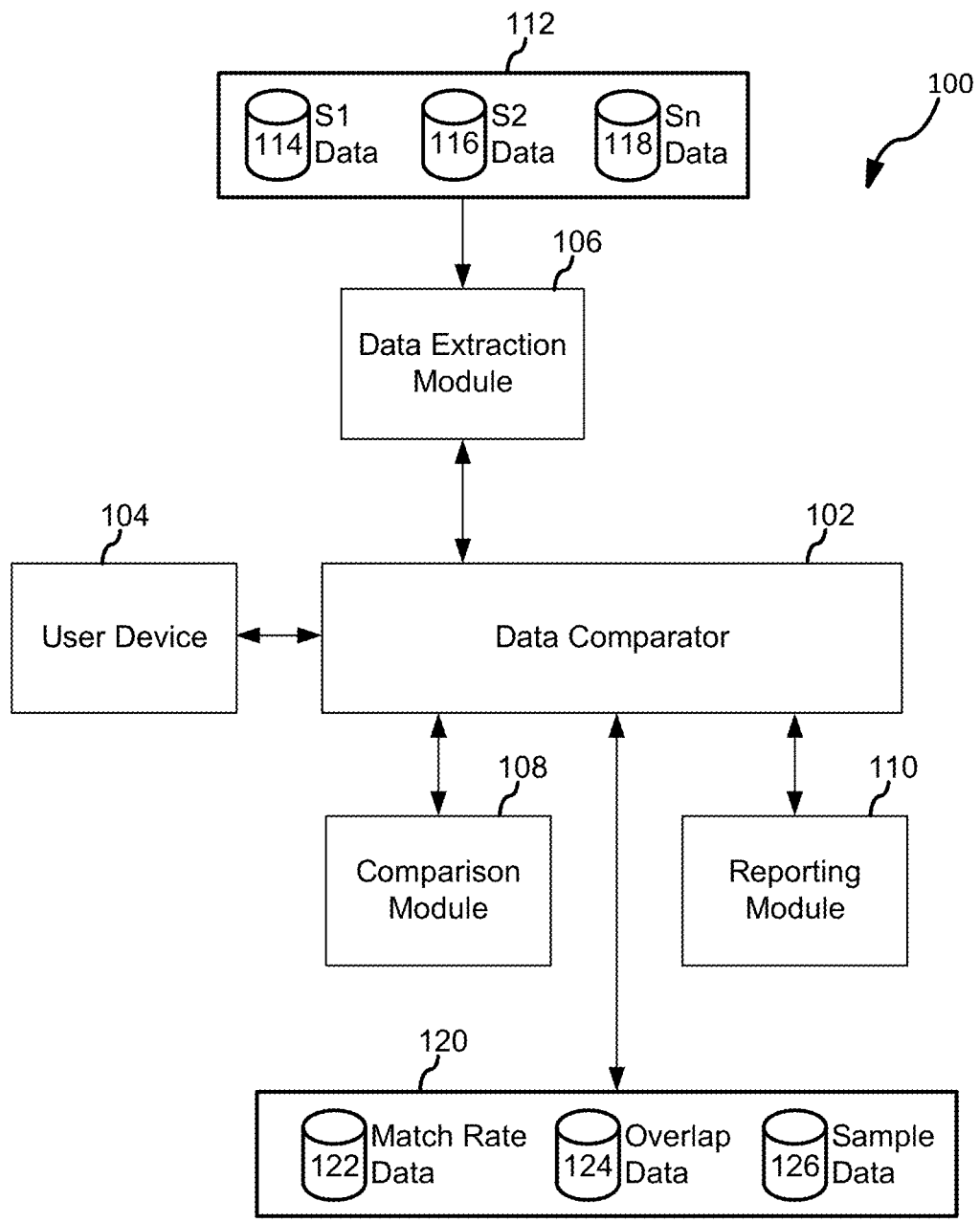
FIG. 1 is a block diagram illustrating various system components of a data comparator system, in accordance with various embodiments.

The system may provide a greater level of sophistication and/or control for big data systems. For example, data may be gathered from multiple data sources comprising multiple dissimilar rows and columns and may be distributed across multiple platforms. While prior art systems typically include the technical problem of demanding re-entry, regathering, and/or reformatting of data (in addition to development of custom scripts to compare the desired data sources), the current system provides a technical solution by including a configurable metadata register and a generic script set. In this regard, the system may enable comparison of data sets across platforms. As such, the system may eliminate or reduce information gaps, reduce re-entry of data, and reduce record duplication, and reduce development time. The system may also reduce the cost of development or system processing time for data entry, reduce network utilization, and/or reduce data storage overhead. The system may increase data reliability and/or accuracy by enabling comparison of data between environments at an increased frequency. The system may also reduce redundant or duplicate comparison tasks, thereby reducing a demand for system resources. The system may simplify data mining and enhance the user experience by decreasing the number of user interactions (e.g., duplicate comparison requests, platform specific requests, etc). Benefits of the present disclosure may apply to any suitable integrated data environment.

This process improves the functioning of the computer. For example, decreasing parallel recordkeeping in dissimilar data environments improves storage capacity. Similarly, the process increases the reliability and speed of data presentation by enabling direct comparison of real time data between environments on the basis of metadata elements. The system increases the reliability and speed of analysis by enabling a generic set of comparison reports accessible across platforms. In this regard, by transmitting, storing, and/or accessing data using the processes described herein, the informational utility of the data is improved, and errors are reduced. Such improvements also increase the efficiency of the network by reducing a portion of duplicated effort as additional data sources are identified for comparison.

In various embodiments, the processes significantly reduce back end processing and reduce processing time for determining relationships between data sources. In this regard, the processes may decrease processing overhead of computing systems comprising multiple data platforms and environments. In various embodiments, the processes may increase network availability by reducing front end and back end process calls. The processes may also save processing resources including CPU time, memory resources, and/or network resources. For example, the process may incorporate memory computations over SPARK™ DataFrames thereby increasing memory processing speeds. In various embodiments, the processes may include a direct pipeline between a processing arena and one or more data sources tending thereby to enable greater utilization of volatile memory space.

In various embodiments, and with reference to FIG. 1, a system 100 may comprise a data comparator 102, a user device 104, a data extraction module 106, a comparison module 108, a reporting module 110, a database 112, and a post-process data set 120. Any of these components may be outsourced and/or be in communication with the data comparator 102 via a network.

System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. In various embodiments, the data comparator 102 may be configured as a central network element or hub to access various systems, engines, and components of system 100. The data comparator 102 may comprise a network, computer-based system, and/or software components configured to provide an access point to various systems, engines, and components of system 100. The data comparator 102 may be in operative and/or electronic communication with user device 104, data extraction module 106, comparison module 108, reporting module 110, database 112, and post-process data set 120. In this regard, the data comparator 102 may allow communication from the user device 104 to systems, engines, and components of system 100. In various embodiments, the data comparator 102 may receive commands and/or metadata from the user device 104 and may pass reports to the user device 104.

In various embodiments, the user device 104 may comprise software and/or hardware in communication with the system 100 via a network comprising hardware and/or software configured to allow a user, and/or the like, access to the data comparator 102. The user device may comprise any suitable device that is configured to allow a user to communicate with a network and the system 100. The user device may include, for example, a personal computer, personal digital assistant, cellular phone, kiosk, and/or the like and may allow a user to transmit comparison requests to the system 100.

In various embodiments, database 112 may comprise any a plurality of data sources or data structures such as a first data source (S1 data) 114, a second data source (S2 Data) 116, and an n$^{th}$ data source (Sn data) 118. Each source may comprise tables or data sets in structured or unstructured formats. The data sources may be hosed on various platforms such as, for example, HIVE®, HADOOP®, ELAS-TICSEARCH®, COUCHBASE®, HBASE® and/or the like. The database 112 is in communication with the data extraction module 106. The data extraction module 106 is configured to extract data sets from the various data sources (114, 116, 118) for comparison by the comparison module 108. The data extraction module 106 may be configured in response to a source configuration metadata from the user device 104. In various embodiments, the data extraction module 106 may perform data validation operations and/or the like on the data sources (114, 116, 118). The data extraction module 106 may generate a pre-work data set for the comparison module 108 from the data sources (114, 116, 118).

In various embodiments, the comparison module 108 may receive the pre-work data set from the data extraction module 106. The comparison module 108 may be configured to compare the data elements of the pre-work data set to generate the post-process data set 120. The comparison module 108 may be configured to generate the post-process data set 120 in response to a comparison configuration metadata received from the user device 104. The post-process data set 120 includes match rate data 122, overlap data 124, and sample data 126 corresponding to the data elements of the pre-work data.

In various embodiments, the reporting module 110 may generate and display one or more reports corresponding to the post-process data set 120 via the user device 104. For example, the reporting module 110 may generate a match rate report, an overlap report, and a sample report corresponding, respectively, to the match rate data 122, overlap data 124, and sample data 126. In various embodiments, the reporting module may push reports and/or notification messages to a user device 104 via e-mail, text, directory push and/or the like.

Figure 2:
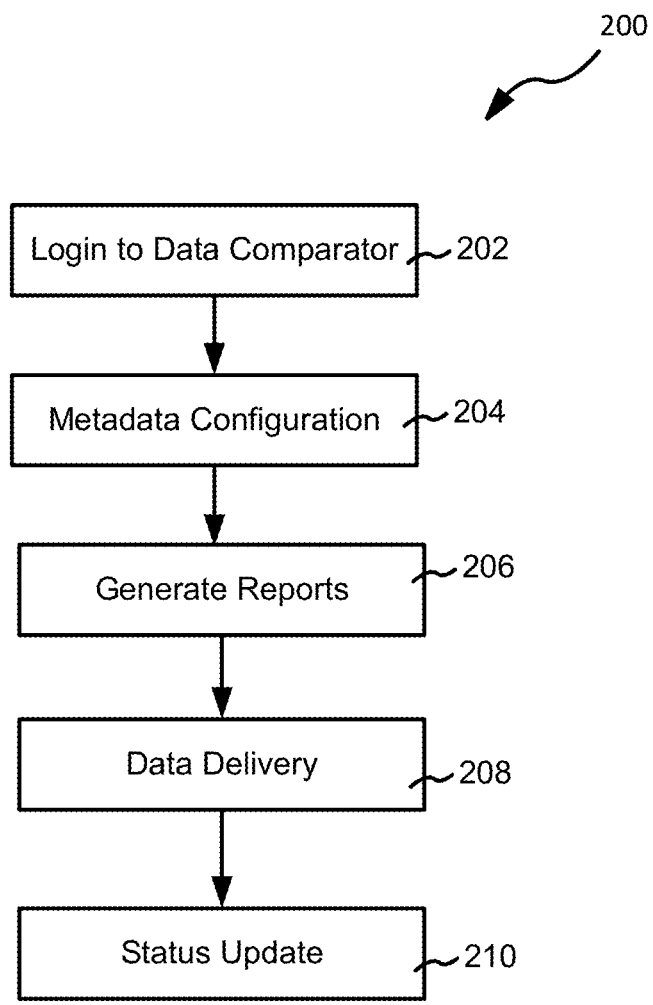
FIG. 2 illustrates a process flow for data comparison in a data comparator system, in accordance with various embodiments.

In various embodiments, and with additional reference to FIG. 2, a process 200 for data comparison in a data comparator system (e.g., system 100) is illustrated. Process 200 includes a user logging in to the data comparator 102 via user device 104 (step 202). Step 202 may include receiving, by the data comparator 102, a user credential set. The user credential set may comprise, for example, a username, a password, an authentication token, and/or the like. The system may validate the user credential set and, in response, may start a metadata configuration process (step 204).

In various embodiments, step 204 includes prompting the user via user device 104 to create and register the source configuration metadata and the comparison configuration metadata. The system may receive the source configuration metadata and the comparison configuration metadata from the user device 104. The comparison configuration metadata may define a comparison job type comprising a desired data set, collection of data sources, and report types. In various embodiments, the comparison configuration metadata may include any of the elements of TABLE 1 below. In various embodiments, the comparison configuration metadata may include a report type, a comparison name, a comparison description, a column name, a derived logic, or a filter logic.

TABLE 1

Registration Data

| Element | Description |
| --- | --- |
| Comparison Name | "Comparison X" |
| Comparison Description | "This comparison is between a first data source and a second data source" |

TABLE 1-continued

Registration Data

| Element | Description |
| --- | --- |
| Business Owner | "Joe Owner" |
| Comparison Update Access | Email list of users who can edit comparison configuration metadata and/or source configuration metadata. |
| Comparison Email List | Email list of users to receive reports. |

The source configuration metadata includes data related to the various data sources (114, 116, 118). For example, the source configuration metadata may specify a HIVE data source and an ELASTICSEARCH data source for comparison. The source configuration metadata may include data elements such as a database name, a table name, a table filer and a joining column related to the HIVE data source. The source configuration metadata may include data elements such as a host, a port, a user, a password, an index, and a table filter related to the ELASTICSEARCH data source. In this regard, the data extraction module 106 is configured to extract data from a data set including each of the desired data sources by using the source configuration metadata. Stated another way, the source configuration metadata targets the data extraction module at a desired data source. In various embodiments, the metadata comprises information related to the data sources enabling links therebetween. For example, the metadata may include column names, a desired output name, a derived logic, a column filter condition, a dataset filter condition, and/or the like. In various embodiments, the metadata may be stored in a MYSQL® database using REST APIs. In various embodiments, the system may process the metadata in a JSON format for operations such as, for example, extraction, comparison, publishing, and status maintenance. In various embodiments, the source configuration metadata includes at least one of a data location, a data directory, a table name, a table filter, a joining column, a database name, a host name, a port, a username, a password, an index, or a bucket. In various embodiments, the system may store the source configuration metadata and a user may search the stored source configuration metadata and select a desired source from among the search results of the stored source configuration metadata.

In various embodiments, the system may start a report generation process in response to generating the pre-work data from the selected data sources (step 206). Step 206 includes configuring the comparison module based on the comparison configuration metadata. The user may select one or more report types defined in the comparison configuration metadata such as a match rate report an overlap report or a sample report. The comparison module may compare selected elements of the pre-work data to generate a post process data set based on a match rate report, the match rate data, an overlap report based on the overlap data, or a sample report based on the sample data. For example, the post process data set may include data sets corresponding to the selected report types (i.e., a match rate data, an overlap data, and a sample data) which may be used by reporting module 110 to generate the corresponding report type. In this regard, the system may generate a report corresponding to the post-process data set. The comparison configuration metadata includes a comparison name and the comparison configuration metadata may be associated with the comparison name. In this regard, a user may automatically recall the comparison configuration metadata and/or the source configuration metadata and direct the system compare the data sources and generate the desired reports.

In various embodiments, the system may establish a link between data sources based on the metadata such as the comparison configuration metadata to generate linked data. The system may insert the linked data into a data frame. In various embodiments, the system may comprise a three layered structing including a first layer, a second layer, and a third layer. In various embodiments, the first layer may be a data extraction layer configured to capture the linked data in one or more data frames. The first layer may apply a plurality of data filters or transformations (e.g., derived logic) based on the configuration metadata. The second layer may comprise a data comparison layer configured to generate the post-process data set 120 and various reports based thereon. The second layer may include an overlap report algorithm, a match rate algorithm, and a sample match algorithm. In various embodiments, the overlap report algorithm may include source specific overlapping configured to determine a commonality between data within the datasets across a key column based on the configuration metadata. In various embodiments, the overlap report algorithm may include a distribution of data according to the columns of the underlying data sources (e.g., only first source data, only second source data, and overlapping data) and the overlapping data. For example, the data may be divided according to a desired column enabling thereby a breakdown of individual data elements within a particular column. In various embodiments, the match rate algorithm may configured to generate trends of data columns which are matched (i.e. linked) on the key column and contain individual differences in data elements. Stated another way, the match rate algorithm may generate a table of differences in data elements between linked columns of source data. For example, the match rate algorithm may generate a matched percentage and a mismatch percentage for every attribute. In various embodiments, the mismatch percentage may be divided into one or more categories such as, for example, "missing from source one", "missing from source two", "missing from source one and source two", "sourced one and source two present but differ". In various embodiments, the second layer may enable complex data type comparisons such as, for example, array, list, and JSON object comparisons. In various embodiments, the third layer may be a data publishing layer configured to aggregate and summarize the output of the second layer algorithms (i.e., the overlap report algorithm, the match rate algorithm, and the sample match algorithm) as discussed below.

In various embodiments, the system may start a data delivery process in response to generating the report corresponding to the post-process data set (step 208). Step 208 includes reporting module 110 displaying any of the selected report types via the user device 104. In various embodiments, the report may be stored a directory of the database 112 based on the comparison configuration metadata. Step 208 may include the reporting module 110 transmitting the report to a list of email address defined by the comparison configuration metadata (i.e., as defined by the comparison email list element). Stated another way, the data delivery process may be included in the data publishing layer and may publish the data to any number of locations such as, for example, a directory (e.g., directory push), an email address (e.g., email push), or a data visualization portal and/or the like. In various embodiments, the data may be published in any desired format such as, for example, a Microsoft EXCEL™ format.

In various embodiments, the reporting module 110 may display a list of comparison results corresponding to a plurality of comparison jobs (i.e. a jobs list) defined by corresponding sets of source configuration metadata and comparison configuration metadata. The jobs list may include a job stats for each of the jobs (e.g., completed, running, queued). The reporting module 110 may update the job status of a comparison job in response to generating the report (step 210). In various embodiments, any of the comparison jobs may be selected form the jobs list and executed on demand (i.e. event based execution) or may be scheduled for execution (i.e. scheduled based execution). Schedule based execution may include batching of jobs based on a date or time. In various embodiments, the system may display data related to the execution, frequency, and status of scheduled jobs tending thereby to enable tracking of job status and history.

In various embodiments, and with additional reference to FIG. 3, a match rate report 300 is illustrated. The match rate report 300 includes a selection of data elements (i.e., Last name, DoB, SSN, Address, First Name) which have been compared between the first data source (i.e. Source 1) and the second data source (i.e. Source 2). The #Analyzed column corresponds to the number of records which have been compared across each of the first and second data sources. The % matched column corresponds to the percentage of number of analyzed records which match between the first and the second data source for each data element. Similarly, the any one value missing columns indicate, with respect to the first data source and the second data source, the percentage of records where any one of the data elements is missing. The both values missing column shows the percent of records in each of the data sources where the data elements are NULL or blank. The both values present & not matched column shows the percent of records in each of the data sources where the data elements are present but do not match between the first data source and the second data source.

Figure 4:
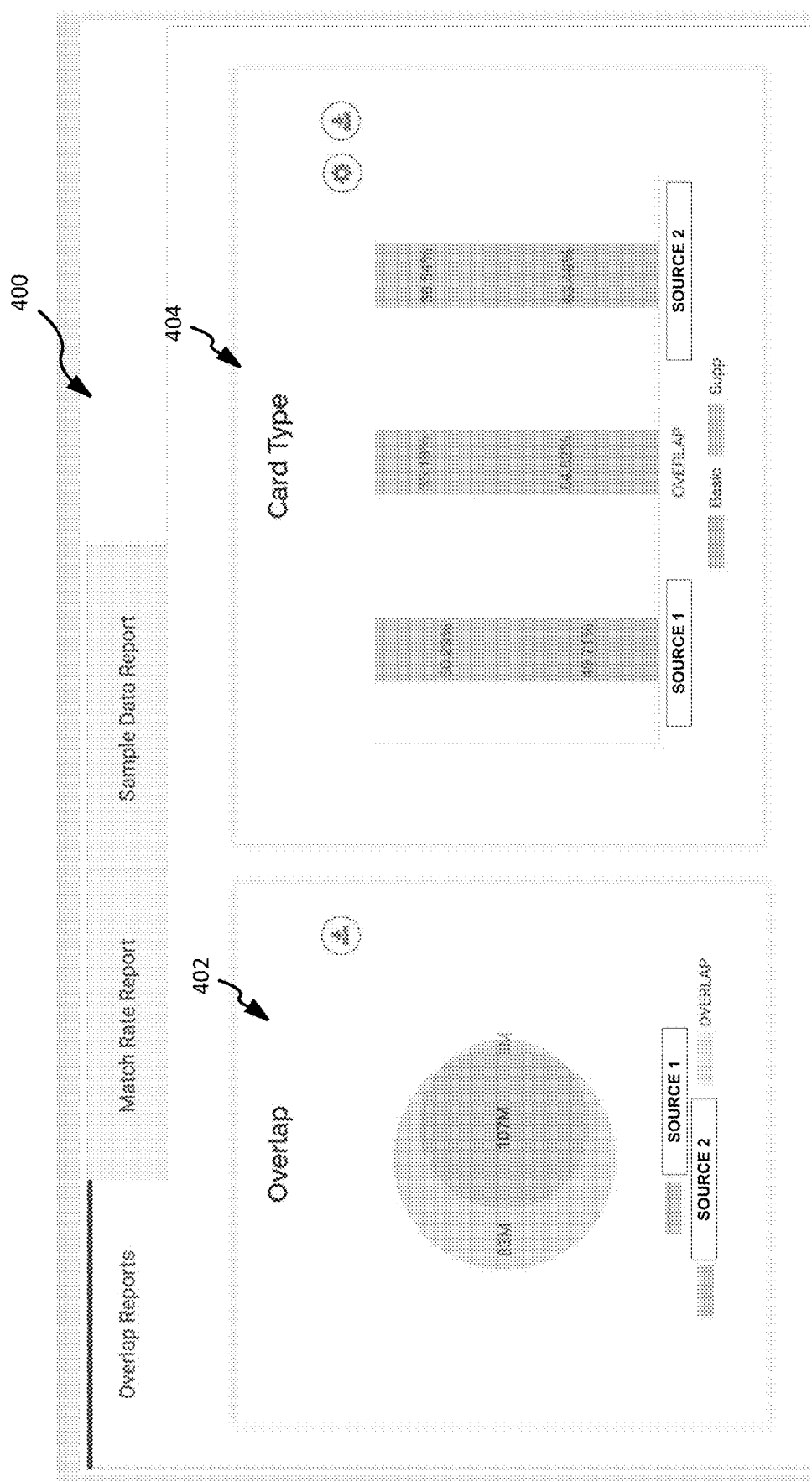
FIG. 4 illustrates an overlap report of a data comparator system, in accordance with various embodiments.

In various embodiments, and with additional reference to FIG. 4, an overlap report 400 is illustrated. The overlap report displays a Venn diagram 402 of the number of records in each of the first data source and the second data source. The exemplary Venn diagram shows the number of records present in the Source 1 but not Source 2 (i.e., 83 million), the number of records present in both Source 1 and Source 2 (107 million), and the number of records present in Source 2 but not Source 1 (3 million). The overlap report 400 may be further present overlap between particular data elements such as, for example, a card type.

Figure 5:
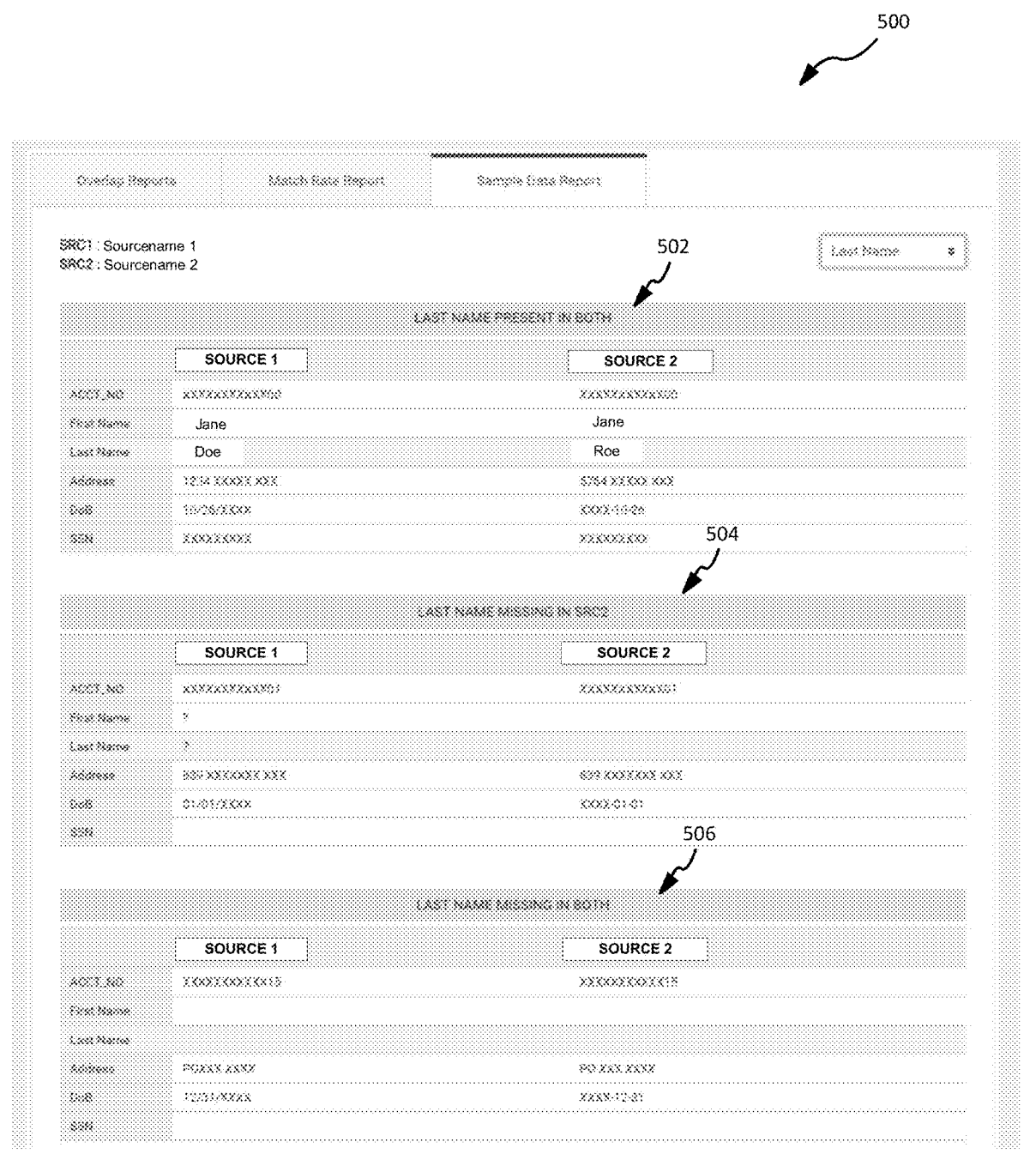

In various embodiments, and with additional reference to FIG. 5, a sample data report 500 is illustrated. The sample data report comprises a sample of unmatched data elements (i.e., matching errors) between the first data source and the second data source. The sample data report 500 may include various matching errors listed in a record type format and correspond to the selected data elements of the match rate report 300. The sample data report 500 may display records 502 corresponding to the both values present & matched column of the match rate report 300. The sample data report 500 may display records 504 corresponding to the any one value missing columns of the match rate report 300. The sample data report 500 may display records 506 corresponding to the both values missing column of the match rate report 300.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

Referring now to FIGS. 2-5, the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-5, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2)

"JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT' Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI' software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communication means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.).

By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein. See, for example, DILIP NAIK, INTERNET STAN- DARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at www.csrc.nist.gov/publications/nistpubs/800-145/SP800-145 (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
  receiving, by a computer based system, source configuration metadata specifying a key column for a first data source;
  extracting, by the computer based system, data from the first data source using a data extraction module, the data extraction module being configured based at least in art on the source configuration metadata;
  receiving, by the computer based system, comparison configuration metadata that comprises a report type;
  establishing, by the computer based system, a link between the first data source and a second data source to generate linked data, wherein the link comprises the key column;
  inserting, by the computer based system, the linked data into a data frame;
  analyzing, by the computer based system, the linked data in the data frame to generate a postprocess data set that comprises a table of differences in data elements in the key column of the first data source and the second data source, the post-process data comprising a match percentage and a mismatch percentage for each attribute in the key column; and generating, by the computer based system, a report based at least in part on the post-process data set, the report type, the match percentage, and the mismatch percentage.

2. The method of claim 1, wherein the post-process data set further includes at least one of an overlap data or a sample data.

3. The method of claim 2, further comprising generating, by the computer based system, at least one of an overlap report based on the overlap data or a sample report based on the sample data.

4. The method of claim 1, wherein the comparison configuration metadata further includes at least one of a comparison name, a comparison description, a column name, a derived logic, or a filter logic.

5. The method of claim 1, wherein the source configuration metadata includes a database name.

6. The method of claim 1, wherein the source configuration metadata includes at least one of a data location, a data directory, a table name, a table filter, or a joining column.

7. The method of claim 1, wherein the source configuration metadata includes at least one of a host name, a port, a username, a password, an index, or a bucket.

8. A system comprising: a processor; and a tangible, non-transitory memory configured to communicate with the processor, the tangible, non-transitory memory having instructions stored thereon that, in response to execution by the processor, cause the processor to perform operations comprising:

receiving, by the processor, source configuration metadata specifying a key column for a first data source;

extracting, by the processor, data from the first data source using a data extraction module, the data extraction module being configured based at least in art on the source configuration metadata;

receiving, by the processor, comparison configuration metadata comprises a report type;

establishing, by the processor, a link between the first data source and a second data to generate linked data, wherein the link comprises the key column;

inserting, by the processor, the linked data into a data frame;

analyzing, by the processor, the linked data in the data frame to generate a postprocess data set that comprises a table of differences in data elements in the key column of the first data source and the second data source, the post-process data comprising a match percentage and a mismatch percentage for each attribute in the key column; and generating, by the processor a report based at least in part on the post-process data set, the report type, the match percentage, and the mismatch percentage.

9. The system of claim 8, wherein the post-process data set includes at least one of an overlap data or a sample data.

10. The system of claim 9, wherein the operations further comprise generating, by the processor, at least one of an overlap report based on the overlap data or a sample report based on the sample data.

11. The system of claim 8, wherein the comparison configuration metadata further includes at least one of a comparison name, a comparison description, a column name, a derived logic, or a filter logic.

12. The system of claim 8, wherein the source configuration metadata includes a database name.

13. The system of claim 8, wherein the source configuration metadata includes at least one of a data location, a data directory, a table name, a table filter, or a joining column.

14. The system of claim 8, wherein the source configuration metadata includes at least one of a host name, a port, a username, a password, an index, or a bucket.

15. An article of manufacture including a non-transitory, tangible computer readable storage medium having instructions stored thereon that, in response to execution by a computer based system, cause the computer based system to perform operations comprising:

receiving, by the computer based system, source configuration metadata specifying a key column for a first data source;

extracting, by the computer based system, data from the first data source using a data extraction module, the data extraction module being configured based at least in art on the source configuration metadata;

receiving, by the computer based system, comparison configuration metadata that comprises a report type;

establishing, by the computer based system, a link between the first data source and a second data source to generate linked data, wherein the link comprises the key column;

inserting, by the computer based system, the linked data into a data frame;

analyzing, by the computer based system, the linked data in the data frame to generate a postprocess data set that comprises a table of differences in data elements in the key column of the first data source and the second data source, the post-process data comprising a match percentage and a mismatch percentage for each attribute in the key column; and generating, by the computer based system, a report based at least in part on the post-process data set, the report type, the match percentage, and the mismatch percentage.

16. The article of manufacture of claim 15, wherein the post-process data set includes at least one of an overlap data or a sample data.

17. The article of manufacture of claim 16, wherein the operations further comprise generating, by the computer based system, at least one of an overlap report based on the overlap data or a sample report based on the sample data.

18. The article of manufacture of claim 15, wherein the comparison configuration metadata includes at least one of a comparison name, a comparison description, a column name, a derived logic, or a filter logic.

19. The article of manufacture of claim 15, wherein the source configuration metadata includes at least one of a data location, a data directory, a table name, a table filter, or a joining column.

20. The article of manufacture of claim 15, wherein the source configuration metadata includes at least one of a database name, a host name, a port, a username, a password, an index, or a bucket.

* * * * *